United States Patent
McKnight et al.

(10) Patent No.: US 11,916,913 B2
(45) Date of Patent: Feb. 27, 2024

(54) SECURE AUDIO TRANSCRIPTION

(71) Applicant: International Business Machines Corporation, Armonk, NY (US)

(72) Inventors: David Kenneth McKnight, Newmarket (CA); Shiu Lee, Scarborough (CA); Yichong Zhang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 16/691,880

(22) Filed: Nov. 22, 2019

(65) Prior Publication Data

US 2021/0160242 A1 May 27, 2021

(51) Int. Cl.
*H04L 9/40* (2022.01)
*G06Q 10/1091* (2023.01)
*G10L 17/00* (2013.01)
*G10L 17/06* (2013.01)
*G10L 17/22* (2013.01)

(52) U.S. Cl.
CPC ....... *H04L 63/102* (2013.01); *G06Q 10/1091* (2013.01); *G10L 17/00* (2013.01); *G10L 17/06* (2013.01); *G10L 17/22* (2013.01); *H04L 63/083* (2013.01); *H04L 2463/121* (2013.01)

(58) Field of Classification Search
CPC ................ H04L 63/102; H04L 63/083; H04L 2463/121; H04L 9/3226; G06Q 10/1091; G10L 17/00; G10L 17/06; G10L 17/22; G10L 15/26; H04W 12/069
See application file for complete search history.

(56) References Cited

U.S. PATENT DOCUMENTS

| 8,554,562 | B2 | 10/2013 | Aronowitz | |
|---|---|---|---|---|
| 10,171,908 | B1 | 1/2019 | Sinkov et al. | |
| 2006/0031290 | A1* | 2/2006 | Mannaru | H04L 12/1831 |
| | | | | 348/E7.083 |
| 2008/0033986 | A1* | 2/2008 | McCusker | G06F 16/61 |
| | | | | 707/999.005 |

(Continued)

OTHER PUBLICATIONS

Brian K. Schmidt, "An Architecture for distributed, Interactive, multi-stream, multi-participant audio and video," Apr. 1999, pp. 1-43. (Year: 1999).*

(Continued)

*Primary Examiner* — Luu T Pham
*Assistant Examiner* — Canh Le
(74) *Attorney, Agent, or Firm* — Eric W. Chesley

(57) ABSTRACT

A user requests to join a meeting is detected. The meeting includes a meeting audio stream of one or more participant audio streams that include participant timestamps that correspond to when one or more other users are in the meeting. The user is prompted for an authentication credential based on the detecting the request to join the meeting. A participant profile of the user is determined based the authentication credential. The user is authorized access to the meeting and a first timestamp is saved. A first audio stream of the user is recorded. The user is identified as having left the meeting and a second timestamp is saved. A transcript of the meeting audio stream is generated based on the first audio stream and the one or more participant audio streams. The first timestamp, the second timestamp, and the meeting are associated with the participant profile.

17 Claims, 8 Drawing Sheets

(56) References Cited

U.S. PATENT DOCUMENTS

| | | | |
|---|---|---|---|
| 2014/0074467 | A1 | 3/2014 | Ziv et al. |
| 2015/0149173 | A1* | 5/2015 | Korycki .................. G10L 17/00 704/246 |
| 2015/0363609 | A1* | 12/2015 | Huang ................ G06F 21/6218 713/165 |
| 2016/0182580 | A1* | 6/2016 | Nayak ................ H04L 65/4038 709/204 |
| 2016/0277455 | A1* | 9/2016 | Xi ........................... H04L 67/52 |
| 2017/0180378 | A1* | 6/2017 | Tyler .................. H04L 63/1433 |
| 2017/0287482 | A1 | 10/2017 | Jackson |
| 2019/0066693 | A1 | 2/2019 | Ziv et al. |
| 2019/0207946 | A1* | 7/2019 | Mertens .............. G06F 21/6245 |
| 2020/0126583 | A1* | 4/2020 | Pokharel ............. G10L 15/1822 |
| 2020/0349950 | A1* | 11/2020 | Yoshioka .............. G10L 15/083 |
| 2020/0349954 | A1* | 11/2020 | Yoshioka ............ G10L 21/0272 |
| 2020/0403818 | A1* | 12/2020 | Daredia ................. G06N 20/00 |
| 2022/0214859 | A1* | 7/2022 | El Ghazzal ............. G06F 3/165 |

OTHER PUBLICATIONS

Ross Cutler, "Distributed Meetings: A meeting capture and broadcasting system," Dec. 2022, pp. 503-572. (Year: 2002).*

Stolcke et al., "Leveraging Speaker Diarization for Meeting Recognition From Distant Microphones," ICASSP 2010, 2010 IEEE International Conference on Acoustics, Speech and Signal Processing, pp. 4390-4390, IEEE. http://www.icsi.berkeley.edu/pubs/speech/leveragingspeaker10.pdf.

Canseco-Rodriguez et al., "Speaker Diarization from Speech transcripts," Interspeech 2004—ICSLP, 8th International Conference on Spoken Language Processing, 2004, 4 pages.

"Speaker diarisation," Wikipedia, printed: Aug. 5, 2019, 2 pages. https://en.wikipedia.org/wiki/Speaker_diarisation.

"Mixture model," Wikipedia, printed: Aug. 5, 2019, 14 pages. https://en.wikipedia.org/wiki/Mixture_model.

"Hidden Markov model," Wikipedia, printed: Aug. 5, 2019, 20 pages. https://en.wikipedia.org/wiki/Hidden_Markov_Model.

Asawa et al., "Deep Learning Approaches for Online Speaker Diarization," Stanford CS224S / LINGUIST285—Spoken Language Processing, Report, 2017, 8 pages.

Machupalli, V., "Who's Speaking?: Speaker Diarization with Watson-to-Text API," IBM, Cloud, Blog, May 17, 2017, 8 pages, https://www.ibm.com/cloud/blog/whos-speaking-speaker-diarization-watson-speech-text-api.

"Cloud Speech-to-Text: Separating different speakers in an audio recording," Google Cloud, printed: Jun. 11, 2019, 5 pages, https://cloud.google.com/speech-to-text/docs/multiple-voices.

Pardo et al., "Speaker Diarization for Multi-microphone Meetings Using Only Between-Channel Differences," Conference Paper, May 2006, (MLMI 2006, LNCS 4299), pp. 257-264.

"Cloud Speech-to-Text: Transcribing audio with multiple channels," Google Cloud, printed: Jun. 11, 2019, 4 pages. https://cloud.google.com/speech-to-text/docs/multi-channel.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

SECURE AUDIO TRANSCRIPTION

BACKGROUND

The present disclosure relates to secure meetings, and more specifically, to increasing the accuracy of identifying meeting participants while maintaining participant privacy.

Audio streams may include various noises or sounds in them (e.g., birds singing, a waterfall, the rustling of moving furniture). Audio streams may in some cases be of human beings, such as multiple people having a conversation with each other. Techniques to record human beings and transcribe the conversation may not protect the privacy of the individuals having the conversation.

SUMMARY

According to embodiments disclosed are a method, system, and computer program product. A request from a first user to join a meeting is detected. The meeting includes a meeting audio stream of one or more participant audio streams. The one or more participant audio streams correspond to one or more users of the meeting. Each of the one or more participant audio streams include participant timestamps that correspond to when the one or more users are a part of the meeting.

The first user is prompted for an authentication credential. The first user is prompted based on the detecting the request to join the meeting. Based on receiving the authentication the authentication credential from the first user a participant profile of the first user is determined. The first user is authorized access to the meeting at a first time. A first timestamp of the first time is saved. A first audio stream of the first user is recorded. The first user is identified as having left the meeting at a second time. The second timestamp of the second time is saved. A transcript of the meeting audio stream is generated based on the first audio stream. The transcript of the meeting audio stream is also generated based on the one or more participant audio streams. The first timestamp, the second timestamp, and the meeting are associated with the participant profile of the first user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
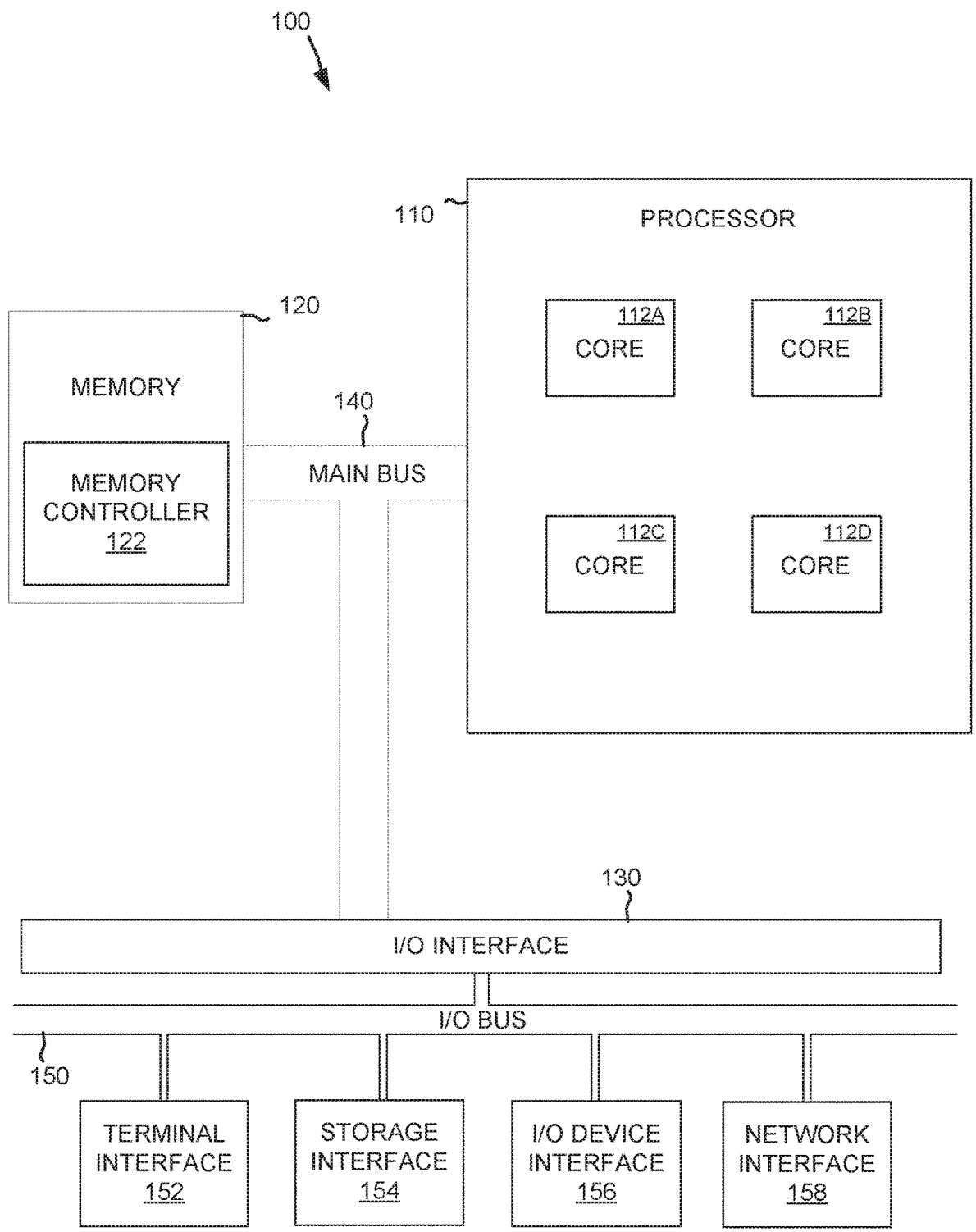
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to secure meetings; more particular aspects relate to increasing the accuracy of identifying meeting participants while maintaining participant privacy. While the present disclosure is not necessarily limited to such applications, various aspects of the disclosure may be appreciated through a discussion of various examples using this context.

Increasingly people have meetings to discuss various subjects that they may later want to reference. For example, people of a volunteer organization may want to reference meeting minutes to enact various decisions that were decided upon in a previous meeting. In another example, certain meeting participants may not recall the specifics of a meeting and may want to later review a transcript to ensure they understood the decisions that were made in a meeting. Often these meeting can be quite important for the parties involved (e.g., manager and employee, lawyer and client, doctor and patient, formal agreements between friends).

There are certain options that exist for determining what was said in a meeting and generating an accurate transcription (e.g., diarisation). Diarisation may be a process of dividing up an audio stream that contains multiple speaking participants ("speakers") for the purpose of transcription. Employing such a process can allow users to automatically textually record the minutes of meetings, legal proceedings, and informal discussions. Diarisation can in some cases serve as a way of distinguishing between speaker identities when issuing voice commands, for audio-command based home systems.

One issue with transcription of audio streams is that the accuracy of the transcription is not necessarily very high. For example, the ability to fully understand a speaking person from a singular microphone may not allow a speech to text engine to understand or fully realize the details of a speaker. Some microphones may only record elements with low fidelity. Other times, a given speaker may have certain dialects, accents, or other unique speech traits associated with the speaker. Transcription techniques may have difficulty processing or understanding the given speaker with unique speech traits. Other times, a single microphone may identify a single participant as multiple participants.

Multi-source transcription techniques may operate to try and improve the accuracy of transcription. Multi-source transcription may operate by using multiple microphones at a single location (e.g., a microphone array). Multi-source transcription may operate based on microphones at different locations (e.g., a first user at a first location with a first microphone, a second user at a second location with a second microphone). Multi-source transcription may be able to rectify some accuracy issues. Unfortunately, in both cases, transcription techniques may lack privacy and security. Further, existing transcription techniques are not opt-in, and are not based on a user. There may be no way to ensure audio streams will be stored safely away from one or more of the participants, to protect from unauthorized access. Existing transcription services may change audio streams into text of persons that did not opt-in to be recorded or transcribed.

Profile-based distributed transcription services (PDTS) may overcome the existing challenges in transcribing and accessing of generated transcripts. For example, to provide speaker consent, more accurate speaker identification, as well as secure storage and retrieval of transcripts may be achieved using a PDTS. Using a PDTS, each speaker may be required to have his or her own device (e.g. a smartphone, laptop, tablet, smart glasses, microphone, etc.). In some embodiments, PDTS may be operated from an app installed for the purpose of participating in meetings and diarisation. Leveraging PDTS may include requiring a user to opt into a conversation. Opting into a conversation may be based on various initiations or requests. For example, each user may start an app to convey an active request to join a meeting. A PDTS may operate with a remote service, for example, by initiating communication with a cloud service. A PDTS may operate by performing profile-based transcription. For example, each participant may provide a user identity and a voice profile (for better accuracy). Over the course of a discussion, each user may record and stream audio from his/her device into a cloud service.

PDTS may provide enhanced privacy of non-participants (e.g., humans that do not prefer to be speakers). For example, because each active user may provide his or her identity and consent to record, the actual identities of all active participants are known as users join a meeting. Known identities may prevent a speaker from being considered more than one person. Those speakers who do not start the app may not be identified with a participant profile and are thus considered non-consenting. The speakers without an associated profile may be ignored by the PDTS. A transcription system that leverages PDTS may fulfill the intent to protect the privacy of those who do not opt in, and to allow omission of non-participants identity and/or comments from transcription.

PDTS may operate against multiple audio stream inputs for synchronization against a common clock. For example, to account for any lag variation between different inputs, PDTS may adjust timings based on common audio segments. One advantage of having audio recordings from each speaker device is that it may ensure all voices are heard clearly. For example, while a voice might be very faint on a singular microphone that is used for a conference call for those users that are far away from the singular microphone. However, with multiple microphones (one for each participant) even a soft-spoken participant may be picked up by the proximate microphone. Another advantage is that redundancy may also ensure that there are backup sources of audio, should one or more input stream be interrupted. Further, the PDTS may get additional dimensions upon which to derive insights from multiple sources, despite the more expensive use of multiple devices each having a microphone.

Another differentiator of PDTS is that processing of each participant audio stream may be performed separately and in parallel to identify only the portions of the conversation where the corresponding user speaks. PDTS may leverage a user profile that includes one or more identifying attributes, such as a voice profile of the participant. Using a participant voice profile, may further allow for more privacy, as all speakers, besides the user associated with a given audio stream (the participant with the voice profile), are filtered out. Using a voice profile may also reduce the processing complexity of the diarisation process. For example, the diarisation task may be simplified by being focused on a single speaker (the participant with the matching voice profile). Further, because each stream processor only focuses on, and is assigned to, a single registered user, transcripts for non-registered users may be omitted (e.g., to protect privacy of non-consenting users). As the content for each registered speaker is identified, the resulting single-user-transcript may be merged with all other single-user transcripts to provide a combined meeting transcript.

In some embodiments, when there is uncertainty as to the identity of speaker, PDTS may provide fallback mechanisms that improve the probability that a correct participant is identified. For example, PDTS may compare transcripts, the different certainty levels of different audio stream handlers, timing difference analysis, and using volume difference analysis between voices of the various streams.

Transcripts resulting from meetings held with PDTS may be securely stored on a cloud-based computer system and may use an open distributed transactional ledger for increased security of transcript storage. The PDTS may provide for one or more application programming interface (APIs). The APIs may be configured to access the full transcript. In some embodiments, the APIs may be configured to only retrieve individual speaker transcripts as well as particular time segments of the transcript. For example, during a meeting a timestamp is recorded at a time a first participant joins the meeting. Later, the first participant leaves the meeting and a second timestamp at the time the first participant leaves is recorded. The timestamps are recorded and associated with the profile of the first participant. The PDTS may be configured to only allow a snippet or subset of the transcript between the timestamps (i.e., the time the first participant was in the meeting) to be retrieved. In some embodiments, only participants who had opted in, or others who are explicitly granted access, may have permissions to retrieve transcript data. Further, participants may by default only be granted access to the portions of the transcript during which they were actively streaming. In some embodiments, each participant may automatically have transcripts sent back and displayed in an app used to connect to the meeting. In some embodiments, the transcripts could also be accessed in other ways, such as via web browser.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may comprise a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may comprise a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may comprise an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
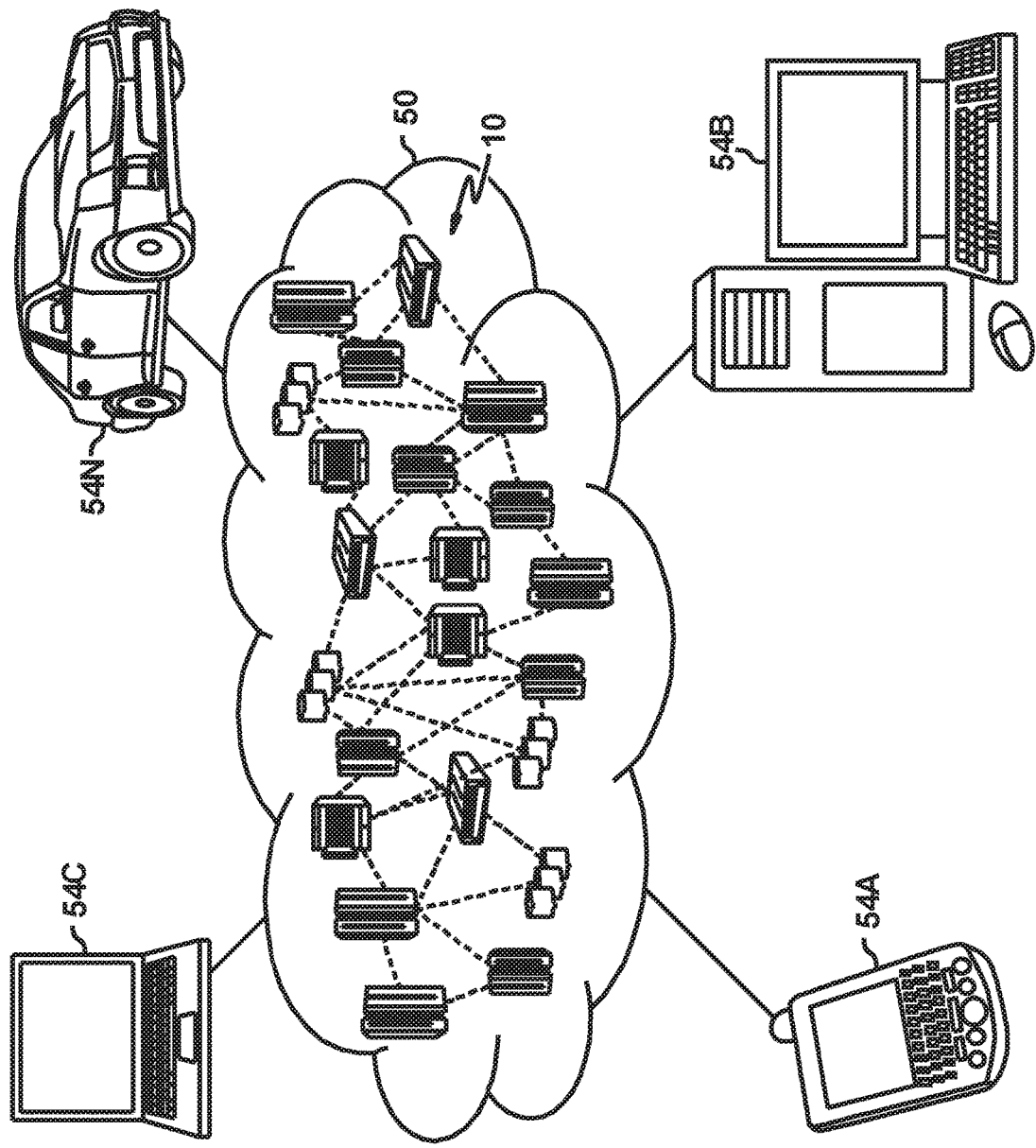
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
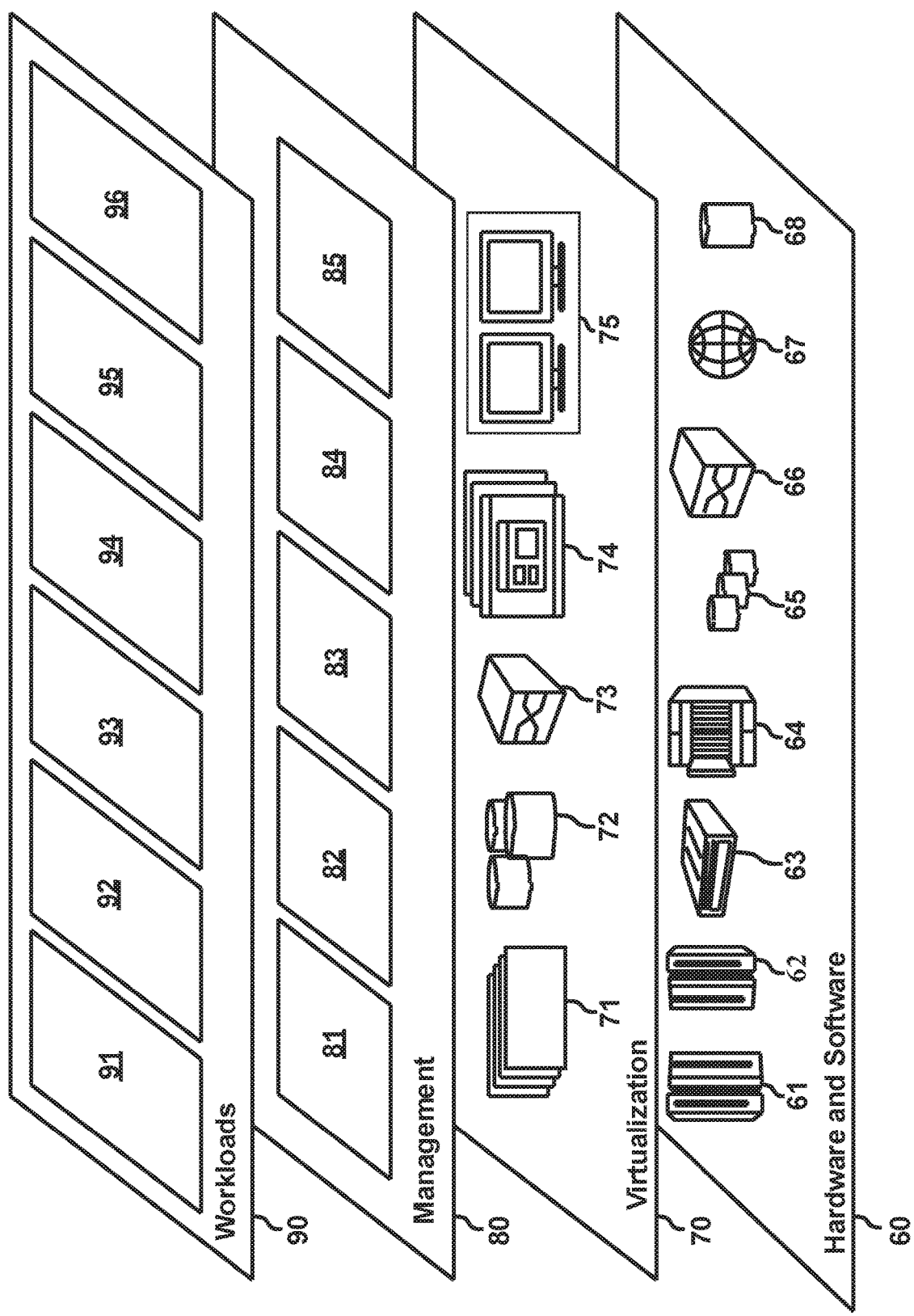
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service level management 84 may operate in conjunction with the workloads layer 90 to perform PDTS. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content update on a virtual machine monitoring.

Figure 4:
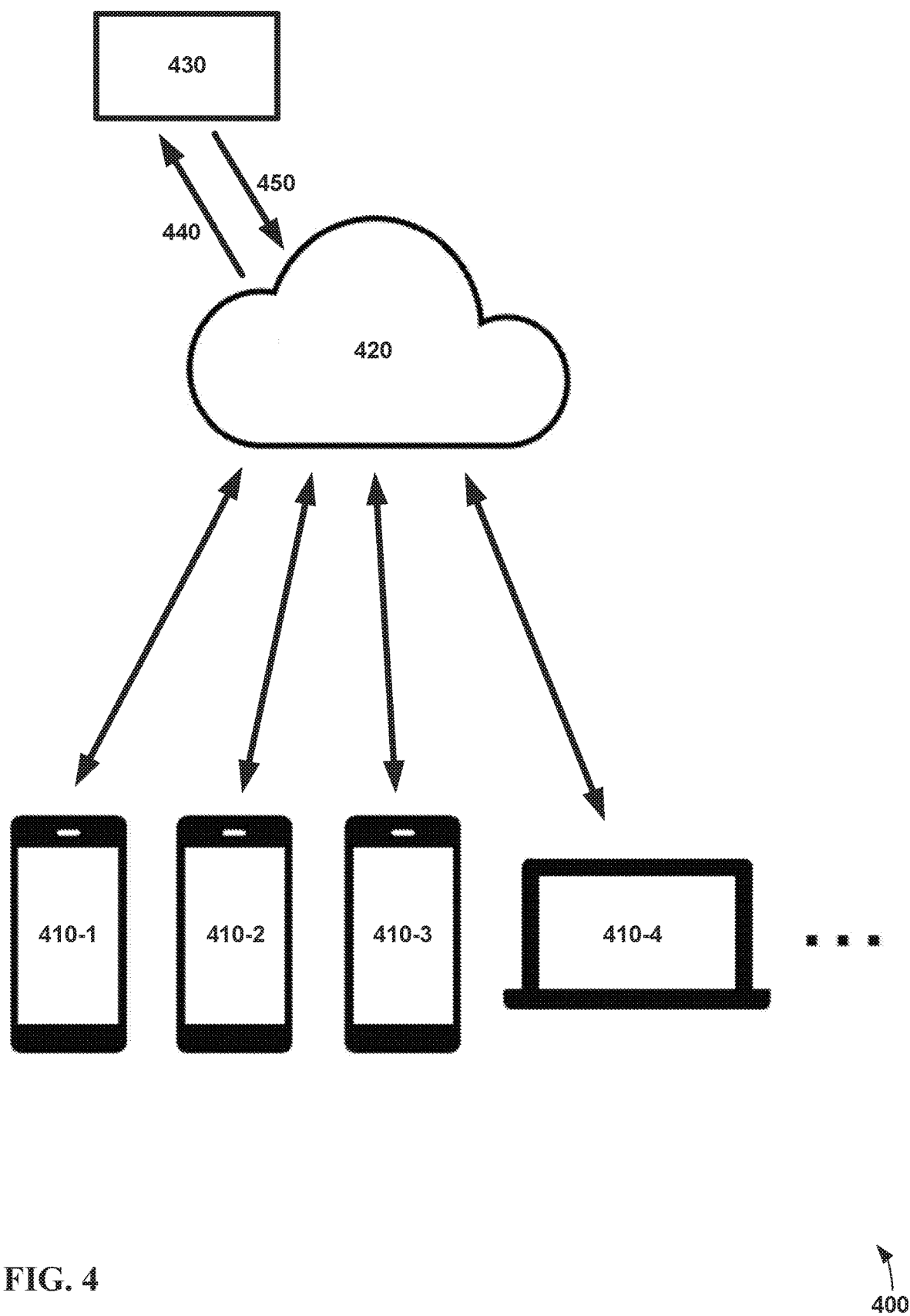
FIG. 4 depicts an example system for profile-based distributed transcription services (PDTS), consistent with some embodiments of the disclosure.

FIG. 4 depicts an example system 400 for PDTS, consistent with some embodiments of the disclosure. System 400 may include the following: one or more client devices 410-1, 410-2, 410-3, 410-4, up to 410-$n$ (collectively, 410); a network 420 for communication; and a PDTS 430 for performing secure meeting transcription.

Client devices 410 may be computing devices configured to perform one or more operations of system 400. Client devices 410 may be a smartphone, a tablet, a personal computer, a laptop, or other computer system. FIG. 1 depicts an example computer system 100 capable of operating as a client device. Each client device 410 may include a microphone for recording an audio stream of a participant user. Client devices 410 may be configured to host a client application ("app") for connecting to a meeting service through the network 420.

Each client device 410 may be configured to host a participant for an audio meeting. The app may be configured to only allow a registered participant to join a meeting. The registration process may include the creation or recording of a voice profile. The voice profile may be of a participant speaking certain standard words or phrases. In some embodiments, the app may prompt the participant to speak words or phrases based on prompts being displayed by a screen of the client device 410.

PDTS 430 may be one or more computer devices, and associated services configured to perform one or more operations of meeting transcription. The PDTS 430 may operate in conjunction with one or more meeting hosting services (not depicted) through a network. The PDTS 430 may be cloud hosted resources or may be performed by one or more individual computer systems (e.g., computer system 100 of FIG. 1). The PDTS 430 may receive, profile information, authentication credentials, or audio streams 440 from the client devices at 410. The audio streams may include the participants recorded voice and the voice of other users. The PDTS 430 and provide transcripts 450 to the client devices 410.

System 400 may operate in an example meeting discussed below. A participant becomes a meeting host by creating a session through client device 410-3. Attendants using the other client devices 410 may start a copy of the app and join the session. Each of the participants' authentication credentials and voice profiles may be retrieved from, or stored in, a data store (not depicted) through the network 420. After joining, the client devices 410 may record the timestamp of respective participants joining the session and the microphones may be enabled and begin recording the participants. As the meeting proceeds between the participants, the PDTS 430 may generate a meeting transcript that is based on diarisation of each audio stream in parallel. Further, the PDTS 430 may transmit the latest combined version of the meeting transcript to each of the client devices 410. In some embodiments, individual participants may update parts of the meeting transcript that represents their contribution (e.g., speech) within a small-time frame. All revisions may be tracked so that the original meeting transcript cannot be removed or changed.

Figure 5:
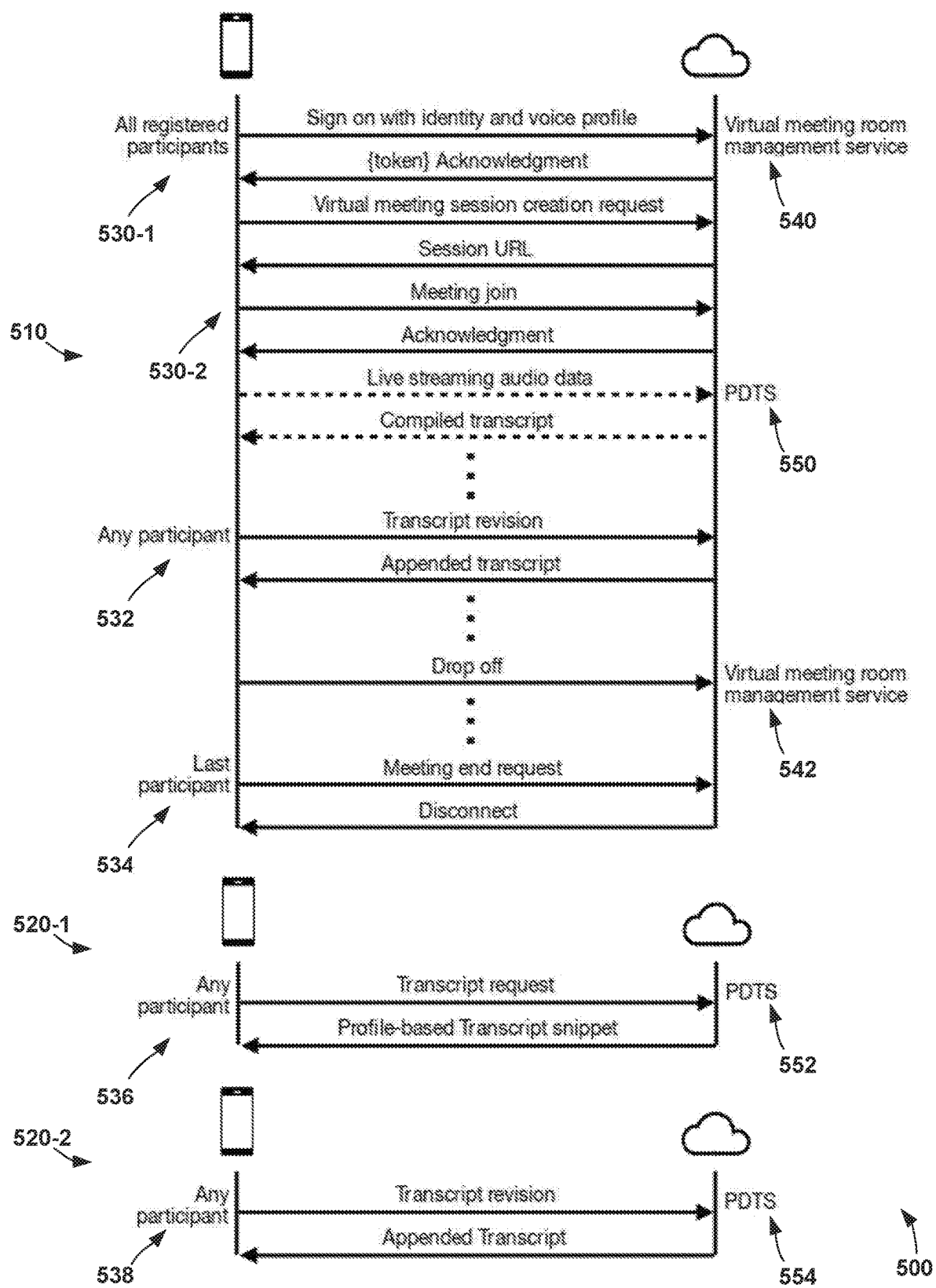
FIG. 5 depicts an example scenario of accurate and secure meeting transcription utilizing PDTS, consistent with some embodiments of the disclosure.

FIG. 5 depicts an example scenario 500 of accurate and secure meeting transcription utilizing PDTS, consistent with some embodiments of the disclosure. Scenario 500 may include a meeting session 510 between five participants; four participants are in person and one person is remote.

The meeting session 510 may begin by three participants in a meeting room and another on the phone sign on at 530-1 to a virtual meeting room management service 540. Each participant may send authentication credentials and voice profiles via personal devices (e.g., smartphone phone app, browser on laptop). The voice profiles may be temporarily stored on the cloud and managed by a PDTS at 550. Each client device and the PDTS may have permissions such that each voice profile can only be accessed by the corresponding voice profile owners (e.g., a first participant can only access a first participant's voice profile). The service 540 may send back acknowledgements to each of the users; each acknowledgement may also include receipt of a unique security token. The session may be started along with a URL provided for others to join the meeting. As participants speak, their voices may be recorded (by the microphones of their personal devices) and the audio is streamed into the PDTS 550. The PDTS may operate and provide text from the participants speech, for each user, and generate personal transcripts. The personal transcripts may be combined into a single meeting transcript that gets broadcast back to all active users.

Sometime later at 530-2, a new person joins the conference. The new person signs on to the service with the meeting URL, authenticating and providing a voice profile. His device may begin recording and streaming audio into the PDTS 550 to be diarized and combined with the master transcript.

At a certain point at 532, one speaker notices a speech-to-text mistake in her portion of the transcript. She may correct the mis-transcribed line, sending the revision back to the PDTS 550. The master transcript includes this revision but also keeps track of the revision history. The appended correction provides for more accuracy but does not allow for misuse (e.g., the original is not lost). The updated transcript may be broadcast to the active users, where each user can compare the revision history if desired.

For personal reasons, one user may need to leave the meeting early, so he drops off the call. This has the effect of closing the audio stream handling for that user at 542 and signing him off. This user may only have permissions to portions of the meeting upon which he was an active consenting participant unless explicitly granted permissions later; for example, a granting of access to the rest of the meeting by a majority of the other participants. In another example, a access could be granted to the entirety of the meeting by any of the other participants.

The meeting comes to an end at 534, when the last participant drops out of the call. The PDTS 550 may clean up all temporary data, storing the completed transcript information securely for later retrieval. In some embodiments, the PDTS 550 may delete the audio stream of the meeting and each of the individual audio streams. Each of these five users will automatically have access to the transcripts for the meeting portions where they were present (e.g., where a given user was connected to the call). In another example, where each user was actively involved by speaking with regularity or contributing at least once every minute or two. By default, a user that shows up late may not be automatically granted access to the early portion of the meeting. By default, a user that leaves early is not automatically granted access to the latter portion of the meeting. Such permissions can however be granted after the fact. For example, another user that was present for a larger portion of the meeting may grant access to a respective larger portion of the transcript to other users.

A first follow-up session 520-1 and a second follow-up session 520-2 may occur at separate times after the meeting session 510. For example, the first follow-up session 520-1 may occur after the meeting session 510 but before the second follow-up session 520-2. In a second example, the second follow-up session 520-2 may occur after the meeting session 510 but before the first follow-up session 520-1. The first follow-up session 520-1 and the second follow-up session 520-2 may operate with a meeting room service or solely based on a PDTS as the operations are not to perform more audio streaming.

At 536 a participant of the meeting session 510 may connect with the PDTS at 552 in the first follow-up session 520-1. During the first follow-up session 520-1 the participant may again provide authentication credentials and may request the transcript of the meeting session 510. The PDTS at 552 may operate to provide a transcript to the participant based on the profile of the participant. The transcript may be a snippet or subset of the entire meeting transcript. For example, based only on the time that the participant was in the meeting.

At 538 a participant of the meeting session 510 may connect with the PDTS at 554 in the second follow-up session 520-2. The participant at 538 may provide authentication credentials and may request to revise a portion of the transcript. The PDTS at 554 may preserve the original version of the transcript, by not allowing the participant to overwrite or delete a portion of the transcript. The PDTS at 554 may operate by allowing the revision to be appended to the original transcript such that any other participant may see both the original and the revision provided during the second follow-up session 520-2.

Figure 6A:
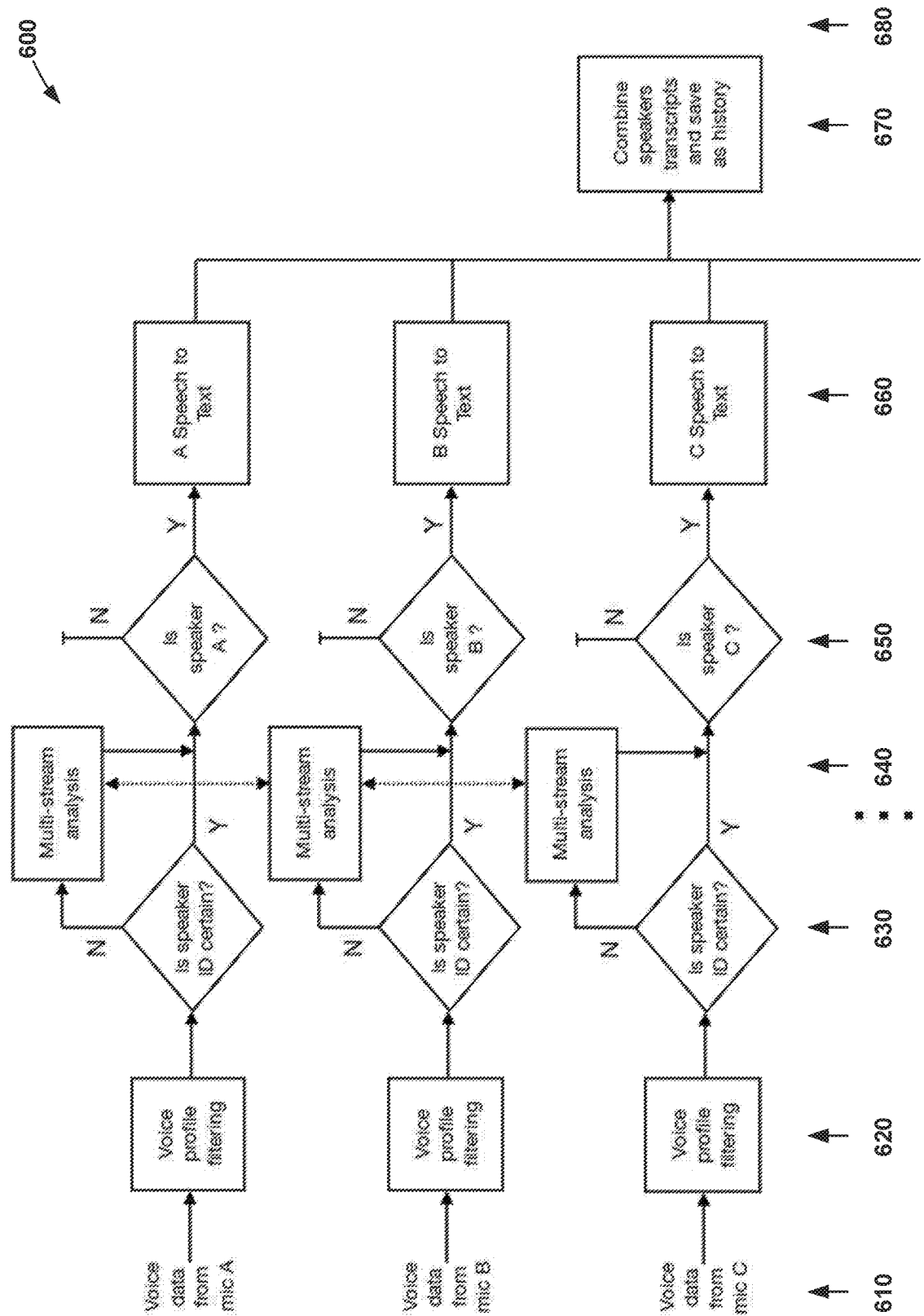
FIG. 6A depicts a flow diagram of an audio stream process utilizing PDTS, consistent with some embodiments of the disclosure.
Figure 6B:
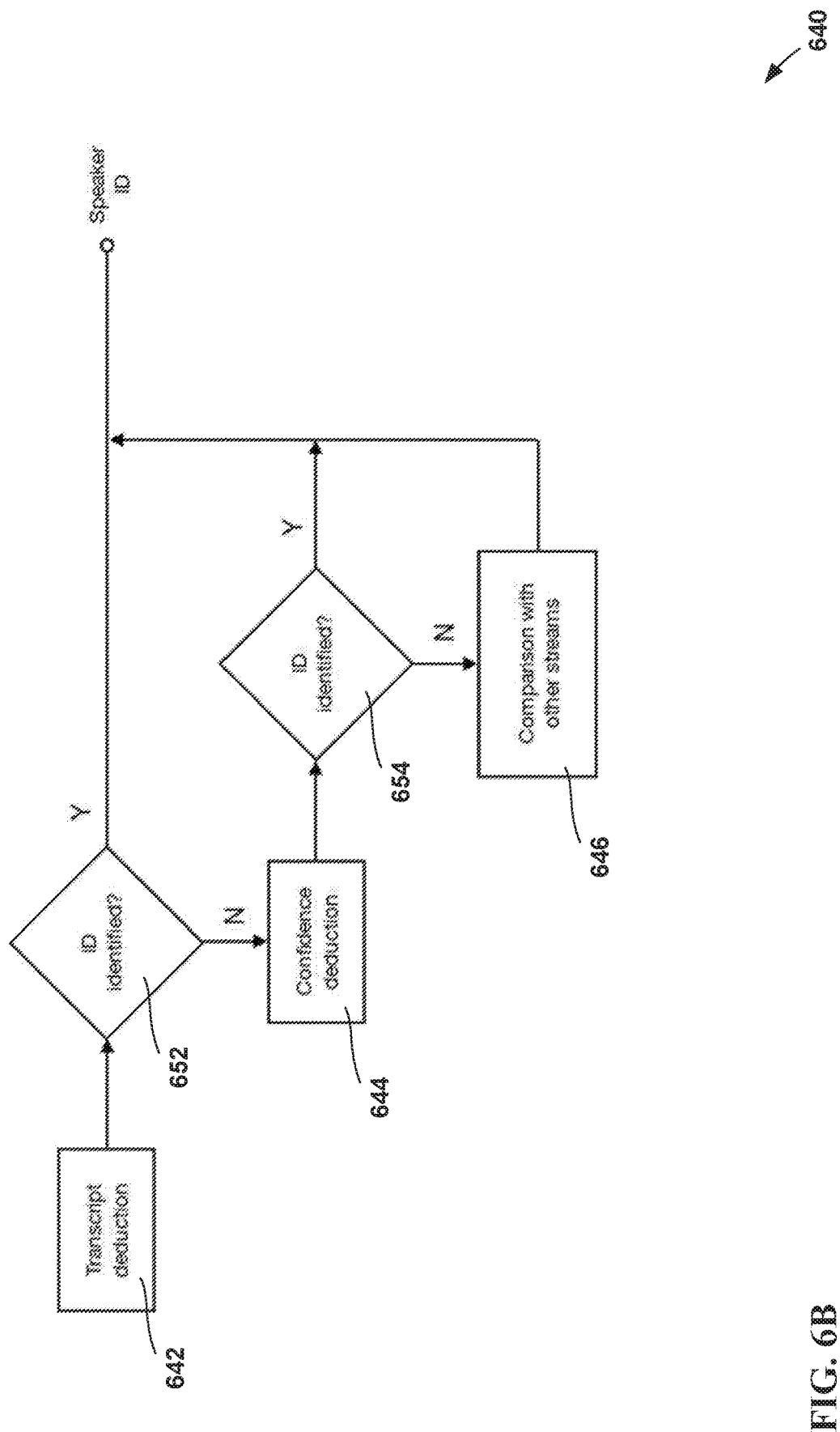
FIG. 6B depicts an example multi-stream analysis of a PDTS, consistent with some embodiments of the disclosure.

FIGS. 6A and 6B may operate based on text analysis. In some embodiments, a natural language processing system may include various components (not depicted) operation through hardware, software, or in some combination. For example, a natural language processor, one or more data sources, a search application, and a report analyzer. The natural language processor may be a computer module that analyses the received content and other information. The natural language processor may perform various methods and techniques for analyzing textual information (e.g., syntactic analysis, semantic analysis, etc.). The natural language processor may be configured to recognize and analyze any number of natural languages. In some embodiments, the natural language processor may parse passages of documents or content from audio streams received from client devices of a PDTS. Various components (not depicted) of the natural language processor may include, but are not limited to, a tokenizer, a part-of-speech (POS) tagger, a semantic relationship identifier, and a syntactic relationship identifier.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., a topic at a later time in a transcript may be a reference to a word or acronym from an early time within the same meeting). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor may be a computer module that may parse a document and generate corresponding data structures for one or more portions of the document. For example, in response to receiving an audio stream of a participant at the natural language processing system, the natural language processor may output parsed text elements from the post as data structures. In some embodiments, a parsed text element may be represented in the form of a parse tree or other graph structure. To generate the parsed text element, the natural language processor may trigger computer modules including the tokenizer, the part-of-speech (POS) tagger, the semantic relationship identifier, and the syntactic relationship identifier.

FIG. 6A depicts a flow diagram of an audio stream process 600 utilizing PDTS, consistent with some embodiments of the disclosure. The audio stream process may be a parallel diarisation process for generating transcripts. For example, client devices A, B, and C (not depicted) may operate to record from corresponding microphones A, B, and C at 610 and transcription for each client may be processed contemporaneously. In some embodiments, process 600 may operate for a meeting of another size, that includes more than three participants.

As a meeting starts the PDTS may retrieve from client devices or from a secure storage voice profiles for each of A, B, and C. The audio input streams may be received at 610 on different threads of a PDTS based on one or more computing devices (e.g., cloud based servers, middleware, etc.) and analyzed in parallel. As audio streams are received, each audio stream may be tagged with a timestamp of a common clock for later synchronization and comparison. At 620, each participant may have their speech filtered by comparing the audio stream to a supplied voice profile. Any voice (e.g., tone, speed, cadence, etc.) that does not match that of the speaking participant's voice profile may be filtered out. The filtering out may be performed before transcription to reduce the overhead of transcription processing. The filtering out may also remove any other voices that are not of a registered participant, which protects the privacy of non-registered participants. The voice profile filtering at 620 of a user may be required for the performance of comparing speech to a voice profile (e.g., at the time of a participant's profile creation, at any time before being allowed to join and participate in a meeting). Any speaker who does not consent to opt-in may be removed based on the filtering, and consequently, by default non-registered users are not transcribed.

At 630:N, if there is uncertainty as to the speaker identity on a given stream, multi-stream analysis may be performed at 640. If a speaker is identified as a given participant at 650:Y, the transcription operations may begin for the identified participant at 660. If the speaker is not recognized at 650:N, that portion of the audio stream may not be transcribed at 660.

At 660 various diarisation and speech-to-text techniques may be performed on each stream to produce a transcript for each user. As user transcripts are produced on each audio stream thread, they are combined into a master meeting transcript at 670 that gets relayed to each registered user. In some embodiments, the resulting transcripts may be cognitively analyzed for semantic understanding using NLP. The resultant individual participant transcripts and the meeting transcript may be securely stored for later retrieval with permissions granted for active participants. A session may terminate at 680 when all participants have stopped producing audio streams. In some embodiments, the synchronized audio stream of all the participants may be saved. The meeting participants may be able to request the audio stream of all the participants. The PDTS may only provide a subset or snippet of the audio stream. In some embodiments, the synchronized audio stream of all the participants and any of the participant audio streams may be purged, deleted or otherwise removed. For example, after performance of speech-to-text techniques, the audio stream may be deleted from a memory of the PDTS. By deleting the audio streams, any non-consenting or non-identified parties' speech may not be saved or shared. Further, any of the participants may not be able to access any of the audio streams of the meeting, because after the PDTS has identified the participants the audio streams may be deleted upon completion of the speech-to-text. In some embodiments, the audio streams may only be saved if there is not an identification of a participant, such as if there is a partial confidence level that a speaker is one of the participants. In some embodiments, the PDTS may detect and flag a revision that is dramatically different from what was initially transcribed using a relevant technique. For example, if a user changes part of his/her transcript from "Yes I agree this contract" to "No, I never pay you this amount!" the PDTS may use NLP to detect and flag that the meaning of the transcript was significantly changed.

FIG. 6B depicts an example multi-stream analysis 640 of a PDTS, consistent with some embodiments of the disclosure. Analysis 640 may occur for a given participant audio stream and may rely on the transcription data of one or more of the participants. Multi-stream analysis may be based on one or more timestamps of each of the various participants of a given meeting. The participant timestamps may correspond to when the participants are a part of the meeting or are not a part of the meeting. For example, a first participant may join a meeting at a first time. The first time may be seven minutes after the beginning of the meeting, based on a meeting clock. The PDTS may determine an offset of the first meeting for the first user based on the meeting clock and a first timestamp of the first time. A second user may also join the meeting at a second time. The second time may be ten minutes after the beginning of the meeting, based on the meeting clock. The PDTS may determine a second offset of the first meeting for the second user based on the meeting clock and a second timestamp of the second time. The PDTS may translate the first offset and the second offset when search various audio streams of the participants, such as a determining a time differential between a first user and a second user.

When there is uncertainty as to the identity of a speaker at 630:N, the common transcript or one of the other audio streams may be queried for the corresponding times to verify if the other audio streams had any uncertainty. Multi-stream analysis 640 may operate at times of uncertainty to identify an otherwise unidentifiable speaker as a participant. For example, if the transcript has not identified the mystery speaker yet 630:N, multi-stream analysis 640 may increase the chances of identifying the mystery speaker as a specific participant.

At 642 transcript deduction may analyze the transcript to determine whether any audio stream processing (from a parallel thread operating on another audio stream) is certain that the corresponding user is not the speaker at 652. For example, based on an audio stream of a first participant and based on performing a profile-based analysis of the audio stream of the first participant, the first participant may still be unidentified. From the transcript, if another audio stream thread has already identified who is speaking at the given time, then we can be satisfied that the owner is not the speaker for this stream but is another participant at 652:Y. For example, another text-to-speech analysis may contemporaneously be performed on a second audio stream. The second audio stream may verify the identity of the second participant was the mystery speaker of the first audio stream at a specific time.

If the speaker is not identified at 652:N, a confidence level deduction at 644 may operate by communicating between each parallel instance of the PDTS. For example, by comparing the confidence levels of each stream for speaker certainty. If, for example, stream B is more confident of the speaker being B than stream A is of the speaker being A, then the system would favor identifying the user as B at 644.

If the speaker is still not identified at 654:N, an audio stream comparison may be performed at 646. Audio-stream comparison 646 may include volume deduction. For example, a normalization and comparison of the volume differences of the various audio streams of the participants may be performed. In another example, a timestamp of certain peaks and valleys of waveforms in the various audio streams of the participants may be compared. The audio-stream comparison 646 may operate to identify based on the shape, size, intensity, and frequency, that a certain speaker spoke louder, or spoke earlier to determine and identify a first participant, a second participant, or another participant from the group of participants of a meeting.

Figure 7:
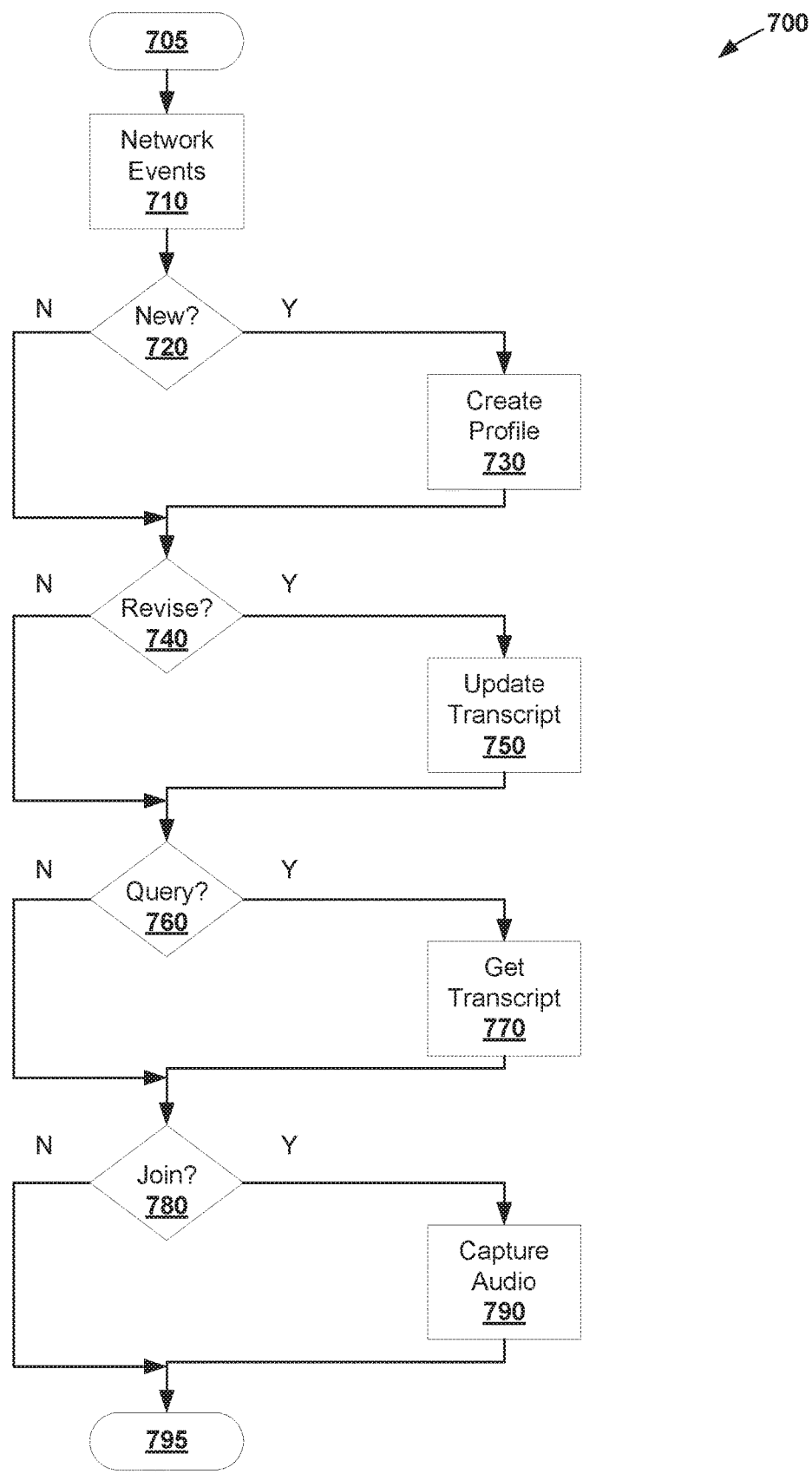
FIG. 7 depicts an example method of meeting recording and transcription consistent with some embodiments of the disclosure.

FIG. 7 depicts an example method 700 of meeting recording and transcription consistent with some embodiments of the disclosure. Method 700 may be performed by a PDTS, such as PDTS 430 of system 400. Method 700 may be performed by a client device, such as client device 410-2 of system 400. In some embodiments, certain operations may be performed by one or more portions of system either alone or in combination.

Method 700 begins, at 705, listening on a network of events for meeting and transcription related requests. The network may be a public or private network, such as the Internet. The listening may be performed by packet inspection, or other relevant network operations to detect requests. The network events may also include specific requests directed towards a meeting. Detection of the request may include polling or accessing an inbound queue or network events stack of a computing device. The requests may include a profile or may be from new users.

If a user is new, at 720:Y, A participant profile may be created at 730. The participant profile creation may include generating one or more credentials in coordination with the new user. For example, the new user may provide or be assigned a username, and likewise may be provided or may provide a password for the participant profile. Profile creation may also include a voice profile of the user. The voice profile may be uploaded from a client device or may be recorded at the time of profile creation.

If the request is a request to revise an existing transcript, at 740:Y, a transcript may be updated at 750. The transcript may be updated by the user based on the participant profile of the user. For example, each meeting that a user joins may be recorded in the participant profile. Only those meetings that the user has joined may be presented as an option for an update. Updating the transcript may include only adding to the transcript. For example, the original transcript may include a first part with a transcription error. The user may only append a correction to the first part, such that anyone that views the transcript can see the original transcription including the error and a profile-stamped correction. The original transcript may be stored in a secure storage that is inaccessible by any user including any participant of a given meeting. Only through the PDTS may a transcript be updated, and the transcript may only be appended.

If the request is a request to query an existing transcript, at 760:Y, the corresponding transcript may be retrieved at 770. The transcript may be retrieved based on a profile of the user. For example, a user may only be able to retrieve a transcript of a meeting that is associated with the profile of the user. Only a subset of the transcript may be retrieved. For example, a profile of a user may include one or more timestamps that indicate the temporal portions of the meeting that a user attended. Upon a request by the user for a retrieval of the entire transcript of the meeting, the meeting transcript may be copied into a temporary space and a subset of the transcript corresponding to the timestamps (i.e., after the user joined and before the user left the meeting) may be generated based on the timestamps. If the transcript was updated with a revision by a user, the transcript may be retrieved with the revisions appended and stamped with the profile name of user that updated the transcript.

If the request is a join request, at 780:Y, then a user may be prompted to authenticate and an audio stream of the user may be captured at 790. The user may authorize themselves at step 790. For example, a user may be prompted to provide authentication credentials, and based on the credentials a profile of the user may be identified. The profile may include a voice profile of the user. The voice profile may include sample audio snippets of the user saying certain words, phrases, and sentences. The authorization of a user may include authentication through the voice profile. For example, Alice logs in using her credential, the service prompts her to say some words, some phrases, a sentence, or other speech. The PDTS may use the speech of Alice to compare with the previously-saved voice profile. The voice verification may prevent unauthorized access from someone else.

The PDTS may provide a listening port to the client app and a client service spawns a thread to record voices and send the audio stream back to the PDTS for processing. The user may be allowed to join the meeting and the voice profile may be used in the transcription process of the user. In some embodiments, the voice profile may be used in the transcription process of other users. As the user joins the meeting a timestamp of the point in time when the user joins the meeting may be recorded and stored associated with both the meeting and the profile of the user. Other instances of method 700 may be performed for other users as they also join the meeting, and correspondingly, timestamps for the other users may be captured along with timestamps. When the user leaves the meeting, another timestamp of the user may be recorded and associated with both meeting and the profile of the user. If a user stops talking in a meeting or if they disconnect it may be determined that they left and a timestamp at the time it was determined that they left is recorded. In other instances of method 700 other users may also be determined to leave the meeting and other corresponding timestamps may be recorded. A multi-stream analysis may operate by synchronizing each of the participant audio streams based on the timestamps of a given user joining and timestamps of a given user leaving that are captured at 790. At 795, method 700 ends.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting a request from a first user to join a meeting, the meeting including a meeting audio stream, wherein the meeting audio stream includes one or more participant audio streams of one or more users of the meeting, and wherein each of the one or more participant audio streams include participant timestamps that correspond to when the one or more users are a part of the meeting;
   prompting, based on the detecting the request to join the meeting, the first user for an authentication credential;
   determining, based on receiving the authentication credential from the first user, a participant profile of the first user;
   authorizing, at a first time, the first user access to the meeting;
   saving a first timestamp of the first time, the first timestamp indicating when the first user joined the meeting;
   recording a first audio stream of the first user;
   identifying, at a second time, the first user has left the meeting;
   saving a second timestamp of the second time, the second timestamp indicating when the first user left the meeting;
   generating a transcript of the meeting audio stream based on the first audio stream, the one or more participant audio streams, and one or more voice profiles of the one or more users;
   associating the first timestamp, the second timestamp, and the meeting with the participant profile of the first user to allow the first user to access a portion of the transcript that is between the first timestamp and the second timestamp, wherein portions of the transcript that are not between the first timestamp and the second timestamp are inaccessible to the first user;
   receiving a request from the first user to access a portion of the transcript associated with a specific time;
   determining, based on the participant profile of the first user, that the specific time is not between the first timestamp and the second timestamp associated with the portion of the transcript that is accessible to the first user;
   identifying a second user who has access to the portion of the transcript associated with the specific time based on a participant profile of the second user indicating that the second user was a participant of the meeting at the specific time; and
   prompting the second user to grant the first user at least partial access to the portion of the transcript associated with the specific time.

2. The method of claim 1, wherein the first user has not joined a meeting before, and
   wherein the method further comprises:
   prompting, before the authorizing, the first user for a first voice profile of the first user.

3. The method of claim 1, wherein the method further comprises:
   identifying a third user in a first portion of a given participant audio stream of the one or more participant audio streams, wherein the third user does not match any of the one or more voice profiles of the one or more participants; and
   removing, before the generating the transcript, the first portion of the given participant audio stream.

4. The method of claim 1, wherein the method further comprises:
   storing the meeting audio stream and the transcript of the meeting audio stream in a storage, wherein only the one or more users of the meeting access to the storage based on associated one or more participant profiles of the one or more users.

5. The method of claim 4, wherein the method further comprises:
receiving a request for the transcript of the meeting audio stream from the first user; and
retrieving, between the first timestamp and the second timestamp, the transcript of the meeting audio stream.

6. The method of claim 4, wherein the method further comprises:
receiving, from the first user, a request for the meeting audio stream; and
retrieving, between the first timestamp and the second timestamp, the meeting audio stream.

7. The method of claim 1, wherein the identifying the first user has left the meeting is based on a disconnection of a computing device of the first user.

8. The method of claim 1, further comprising:
detecting, after the second timestamp, a second request from the first user to join the meeting;
prompting, based on the detecting the second request to join the meeting, the first user for the authentication credential;
authorizing, at a third time and based on receiving the authentication credential, the first user access to the meeting;
saving a third timestamp of the third time;
identifying, at a fourth time, the first user has left the meeting;
saving a fourth timestamp of the fourth time; and
updating the participant profile of the first user by adding the third timestamp and the fourth timestamp.

9. The method of claim 1, wherein the generating the transcript further comprises:
determining, based on the first audio stream, the first user is not identified at a specific time of the first audio stream;
identifying, based on the specific time, a subset of audio streams of the one or more participant audio streams, wherein each audio stream of the subset of audio streams at the specific time do not have an identified user;
translating, based on the first timestamp, a time differential for searching a second audio stream of the subset of audio streams of the one or more participant audio streams; and
searching, based on the specific time, the second audio stream for the first user.

10. The method of claim 1, wherein the detecting the request from the first user to join the meeting is from a first client device, and wherein the method further comprises:
detecting a second request from the first user to join the meeting, wherein the second request is from a second client device;
prompting, based on the detecting the second request to join the meeting, the first user for the authentication credential;
authorizing, at a third time and based on receiving the authentication credential, the first user access to the meeting;
connecting the first user to the meeting on the second client device; and
disconnecting, based on the connecting the first user to the meeting on the second client device, the first client device.

11. The method of claim 1, wherein the participant profile includes a first user voice profile and wherein the authorizing the first user access to the meeting further comprises:
requesting the first user to speak a phrase; and
comparing the phrase to the first user voice profile.

12. A system, the system comprising:
a memory, the memory containing one or more instructions; and
a processor, the processor communicatively coupled to the memory, the processor, in response to reading the one or more instructions, configured to:
detect a request from a first user to join a meeting, the meeting including a meeting audio stream, wherein the meeting audio stream includes one or more participant audio streams of one or more users of the meeting, and wherein each of the one or more participant audio streams include participant timestamps that correspond to when the one or more users are a part of the meeting;
prompt, based on the detect the request to join the meeting, the first user for an authentication credential;
determine, based on receiving the authentication credential from the first user, a participant profile of the first user;
authorize, at a first time, the first user access to the meeting;
save a first timestamp of the first time, the first timestamp indicating when the first user joined the meeting;
record a first audio stream of the first user;
identify, at a second time, the first user has left the meeting;
save a second timestamp of the second time, the second timestamp indicating when the first user left the meeting;
generate a transcript of the meeting audio stream based on the first audio stream, the one or more participant audio streams, and one or more voice profiles of the one or more users;
associate the first timestamp, the second timestamp, and the meeting with the participant profile of the first user to allow the first user to access a portion of the transcript that is between the first timestamp and the second timestamp, wherein portions of the transcript that are not between the first timestamp and the second timestamp are inaccessible to the first user;
receive a request from the first user to access a portion of the transcript associated with a specific time;
determine, based on the participant profile of the first user, that the specific time is not between the first timestamp and the second timestamp associated with the portion of the transcript that is accessible to the first user;
identify a second user who has access to the portion of the transcript associated with the specific time based on a participant profile of the second user indicating that the second user was a participant of the meeting at the specific time; and
prompt the second user to grant the first user at least partial access to the portion of the transcript associated with the specific time.

13. The system of claim 12, wherein the first user has not joined a meeting before, and
wherein the processor is further configured to:
prompt, before the authorize, the first user for a first voice profile of the first user.

14. The system of claim 12, wherein the processor is further configured to:
identify a third user in a first portion of a given participant audio stream of the one or more participant audio streams, wherein the third user does not match any of the one or more voice profiles of the one or more participants; and remove, before generating the transcript, the first portion of the given participant audio stream.

15. A computer program product, the computer program product comprising a computer readable storage medium having program instructions embodied therewith, the program instructions configured to cause a computer to:

detect a request from a first user to join a meeting, the meeting including a meeting audio stream, wherein the meeting audio stream includes one or more participant audio streams of one or more users of the meeting, and wherein each of the one or more participant audio streams include participant timestamps that correspond to when the one or more users are a part of the meeting;

prompt, based on the detect the request to join the meeting, the first user for an authentication credential;

determine, based on receiving the authentication credential from the first user, a participant profile of the first user;

authorize, at a first time, the first user access to the meeting;

save a first timestamp of the first time, the first timestamp indicating when the first user joined the meeting;

record a first audio stream of the first user;

identify, at a second time, the first user has left the meeting;

save a second timestamp of the second time, the second timestamp indicating when the first user left the meeting;

generate a transcript of the meeting audio stream based on the first audio stream, the one or more participant audio streams, and one or more voice profiles of the one or more users;

associate the first timestamp, the second timestamp, and the meeting with the participant profile of the first user to allow the first user to access a portion of the transcript that is between the first timestamp and the second timestamp, wherein portions of the transcript that are not between the first timestamp and the second timestamp are inaccessible to the first user;

receive a request from the first user to access a portion of the transcript associated with a specific time;

determine, based on the participant profile of the first user, that the specific time is not between the first timestamp and the second timestamp associated with the portion of the transcript that is accessible to the first user;

identify a second user who has access to the portion of the transcript associated with the specific time based on a participant profile of the second user indicating that the second user was a participant of the meeting at the specific time; and prompt the second user to grant the first user at least partial access to the portion of the transcript.

16. The computer program product of claim 15, wherein the identify the first user has left the meeting is based on a disconnection of a computing device of the first user.

17. The computer program product of claim 15, wherein the program instructions are further configured to cause a computer to:

detect, after the second timestamp, a second request from the first user to join the meeting;

prompt, based on the detecting the second request to join the meeting, the first user for the authentication credential;

authorize, at a third time and based on receiving the authentication credential, the first user access to the meeting;

save a third timestamp of the third time;

identify, at a fourth time, the first user has left the meeting;

save a fourth timestamp of the fourth time; and update the participant profile of the first user by adding the third timestamp and the fourth timestamp.

* * * * *